United States Patent [19]

Bender et al.

[11] Patent Number: 5,153,715
[45] Date of Patent: Oct. 6, 1992

[54] EXPOSURE DETERMINING COLOR FILM SCANNING APPARATUS FOR A PHOTOFINISHING SYSTEM

[75] Inventors: George L. Bender, Fairport; Walter D. Foley; Bruce E. Rottner, both of Rochester, all of N.Y.

[73] Assignee: Eastman Kodak Company, Rochester, N.Y.

[21] Appl. No.: 618,132

[22] Filed: Nov. 26, 1990

[51] Int. Cl.⁵ .............................................. H04N 9/11
[52] U.S. Cl. ...................... 358/54; 358/214; 355/27
[58] Field of Search .................. 358/43, 44, 50, 54, 358/55, 75, 76, 214; 355/27

[56] References Cited

U.S. PATENT DOCUMENTS

| | | | |
|---|---|---|---|
| 4,278,995 | 7/1981 | Fearnside et al. | 358/54 |
| 4,603,966 | 8/1986 | Brownstein | 358/54 |
| 4,675,727 | 6/1987 | Sekizawa et al. | 358/75 |

FOREIGN PATENT DOCUMENTS 62-053566 3/1987 Japan .
62-053567 3/1987 Japan .

*Primary Examiner*—James J. Groody
*Assistant Examiner*—Kim Yen Vu

[57] ABSTRACT

Color film scanning apparatus employs a novel trilinear array image sensor with photosites spaced apart in the linear direction of array by a pitch which is a multiple of the photosite dimension in the linear direction. The resultant scanning apparatus allows positioning of the image sensor in close proximity to the film without the need for interposition of optics for beam splitting or image focusing on the sensor arrays.

5 Claims, 3 Drawing Sheets

EXPOSURE DETERMINING COLOR FILM SCANNING APPARATUS FOR A PHOTOFINISHING SYSTEM

FIELD OF THE INVENTION

This invention relates to color film scanning apparatus and more particularly to apparatus utilizing solid state linear imaging array devices for scanning color negative or transparency film in a plurality of individual component colors.

BACKGROUND

Scanning of a color film images is commonly accomplished by projecting the image through a lens, dividing it into red, green and blue light using beam splitters and focusing the resultant individual color images on to three separate linear sensor arrays, typically of the charge coupled device (CCD) type. This approach, while effective, has several disadvantages. For example, it requires critical optical alignment between the components of the optical system and there are significant cost involved with the critical alignment procedures as well as with provision of the components involved, such as the lens, beam splitters and related mounting hardware. In addition, the space needed for the optical arrangement produces a bulky design not suited to desired compact scanner designs.

An improved scanner arrangement not requiring beam splitters and separate linear imaging arrays is disclosed in U.S. Pat. No. 4,278,995 commonly assigned to the assignee of the present invention. In this arrangement, the color image is focussed by means of a conventional lens optical system onto a trilinear CCD array in which the linear arrays individually responsive to red, green and blue are positioned side-by-side in a common plane. The signal outputs of two of the three arrays are respectively time delayed by appropriate amounts to cause the red, green and blue values corresponding to a common image pixel to be applied simultaneously to the ensuing video signal processing circuits. In a later U.S. Pat. No. 4,675,727, a similar trilinear arrangement is employed for document scanning but with the conventional lens arrangement replaced by a SELFOC lens arrangement in which individual microscopic lens elements are aligned with photosites on the CCD arrays to focus the image onto the arrays. Arrangements of these types represented improvements over the beam splitter approach but still required costly optical focussing systems with critical alignment considerations for satisfactory operation.

It is therefore an object of the present invention to provide color film scanning apparatus which avoids the disadvantages of prior known scanning apparatus.

It is a further object of the invention to provide color film scanning apparatus that avoids the need for costly and space consuming beam splitters and optical focussing systems.

It is yet another object of the invention to provide color film scanning apparatus that does not require the provision and maintenance of critical alignment techniques for proper operation.

SUMMARY OF THE INVENTION

In carrying out the objects of the invention therefore, color film scanning apparatus is provided which comprises, in part, a scan gate having (a) a film track to guide the film in the main scan direction of the image to be scanned as the film is advanced through the gate, (b) a film plane defining surface in the film track and (c) an elongated scan aperture in the film plane defining surface, the elongated dimension of the aperture being oriented in the subscan direction of the image orthogonal to the main scan direction. A light source, preferably serving as a point source of collimated light, is positioned on the same side of the film in the scan gate as the scan aperture. Solid state image scanning means is provided at the scan aperture on the opposite side of the film from the light source and is comprised of a plurality of parallel linear array sensors the sensors being aligned with the scan aperture and exposed directly to a film image in the film plane without interposition of optical means such as focussing lens or beam splitters. Consequently, the linear sensors are positioned closely adjacent to the film at the scan aperture, lying in a plane spaced slightly from the film plane by a predetermined amount. Each of the linear sensors is responsive respectively to a different color in the image, and each sensor includes a plurality of image pixel sensing photosites with the photosites being spaced apart in the linear dimension by a predetermined pitch between successive photosites, the size of the photosites in at least one of the linear arrays and the pitch therebetween being such, relative to the spacing between the planes of the sensors and the film, as to allow each successive photosite to be exposed to substantially all the light from its respective image pixel on the film without substantial overlap with light from adjacent image pixels in the subscan direction. In a preferred embodiment of the invention, the linear arrays are respectively responsive to red, green and blue colors in the image and the red and green arrays employ the photosite size and pitch relationship just described. The blue responsive array employs larger sized photosites with the same pitch as the red and green responsive arrays. While this does results in some pixel crosstalk in the blue color, it is not considered objectionable due to the relatively higher information in the red and green as compared to blue in the pixel.

DETAILED DESCRIPTION

Figure 1:
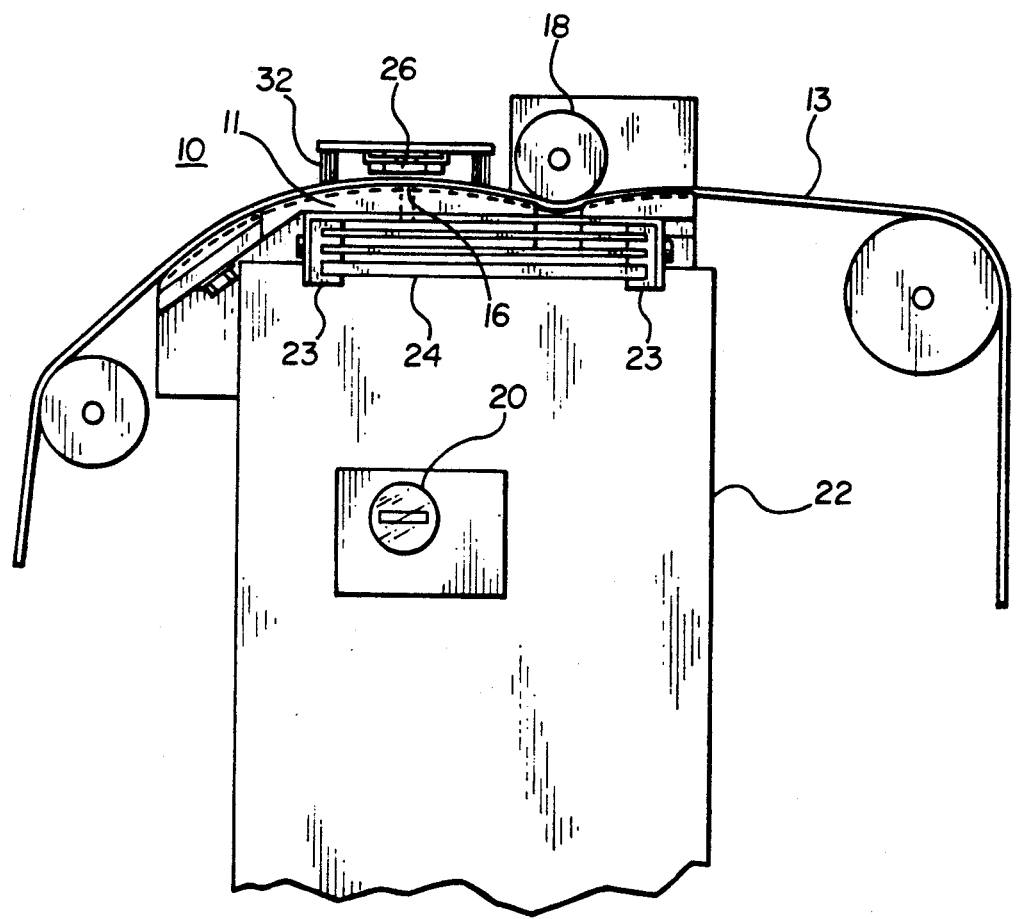
FIG. 1 is a side view of film scanning apparatus of the invention.
Figure 2:
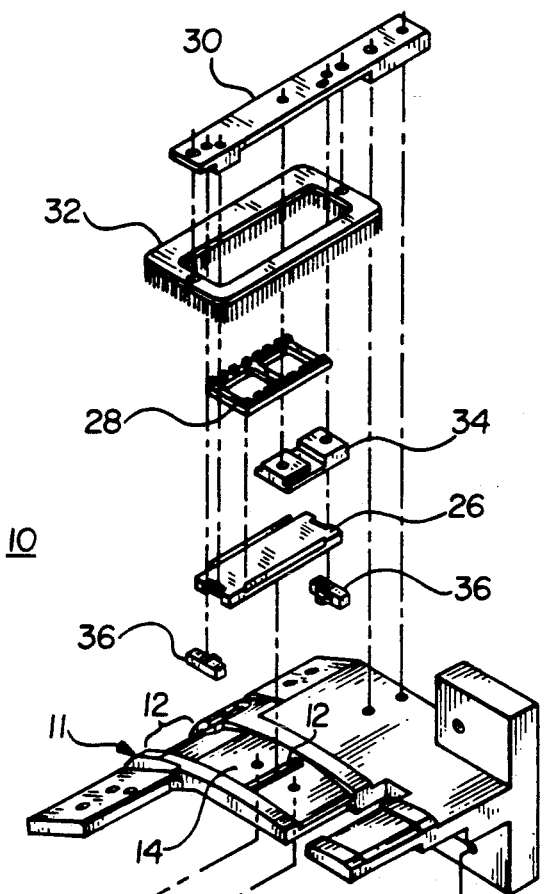
FIG. 2 is an exploded perspective view of the film scanning apparatus of FIG. 1.
Figure 2:
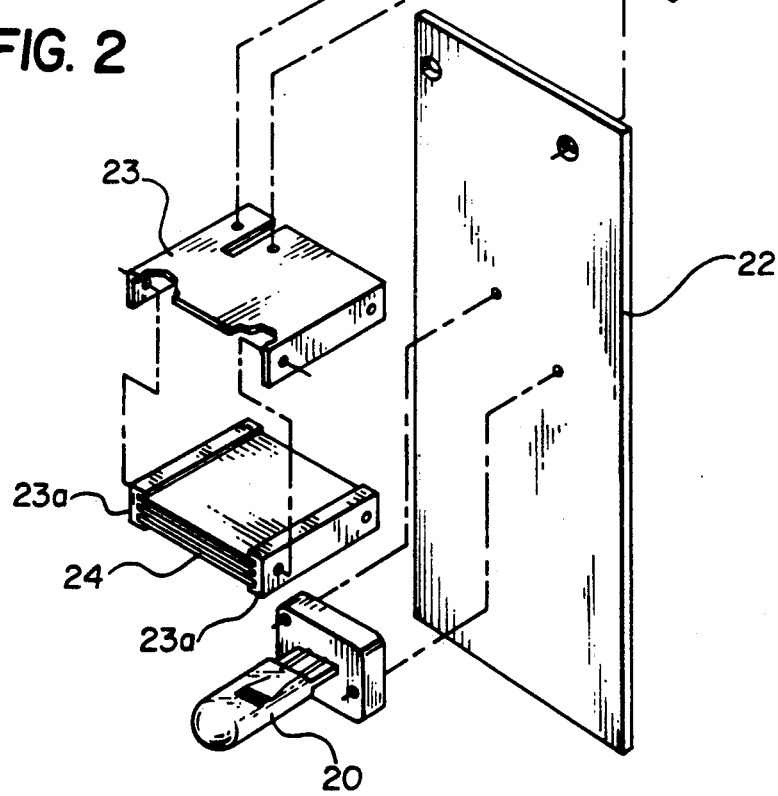

Referring jointly to FIGS. 1 and 2, film scanning apparatus 10 includes a scan gate platform 11 having a film track 12 for guiding film 13 longitudinally along a film plane 14 which encompasses a longitudinal scan aperture 16. As is known in the design of film scanners, the track 12 has a slight curvature to aid in maintaining the film flat in the lateral or cross scan dimension as the film passes over the scan aperture 16. Additionally, a tension roller 18 (FIG. 1) assists in holding the film firmly on the track and in place over the scan aperture 16. Roller 18 may also serve as the drive for pulling the film through the scan gate from the supply to take up reels, not shown. As used herein, the term main scan direction in reference to scanning of images on the film refers to the direction in which scanning progresses down the image opposite to the direction in which the film advances over the scan aperture 16. Correspondingly, the term subscan direction means the lateral scan direction 90° to the main scan and parallel to the elongate dimension of scan aperture 16.

Film scanning apparatus 10 also includes a light source 20 of suitable spectral characteristics positioned in a lamp housing 22, the latter shown with the conventional housing cover removed. In the presently preferred embodiment, the light source 20 is comprised of a tungsten halogen lamp. As will be seen, light source 20 is positioned a substantial distance from scan aperture 16 and serves effectively as a point source of collimated light to illuminate the film as it passes over the scan aperture 16. Filter mounting brackets 23,23a are preferably included in the lamp housing to hold one or more filters 24 between the light source and the scan aperture as is know in the art. Filters 24 may comprise a neutral density filter, a color correction filter and an infra-red filter, the latter being particularly useful because of the high infra-red content of a tungsten halogen lamp.

A linear array image sensor 26 having a plurality of linear array sensors is positioned above the scan aperture 16 with the array sensor aligned in the cross scan direction with the elongated dimension of the scan aperture 16. A socket 28 for receiving sensor 26 is mounted on a support bracket 30 and held in place by holder 34. When image sensor 26 is inserted into socket 28, it is held in place by brackets 36. Brackets 36 and holder 34 may be secured to support bracket 30 by means of suitable screw fasteners. Support bracket 30 is, in turn, held on the scan gate platform 11 by suitable screw fasteners. A flexible brush frame 32 may optionally be provided surrounding the image sensor to serve as a light shield and as a film cleaning device.

Figure 3:
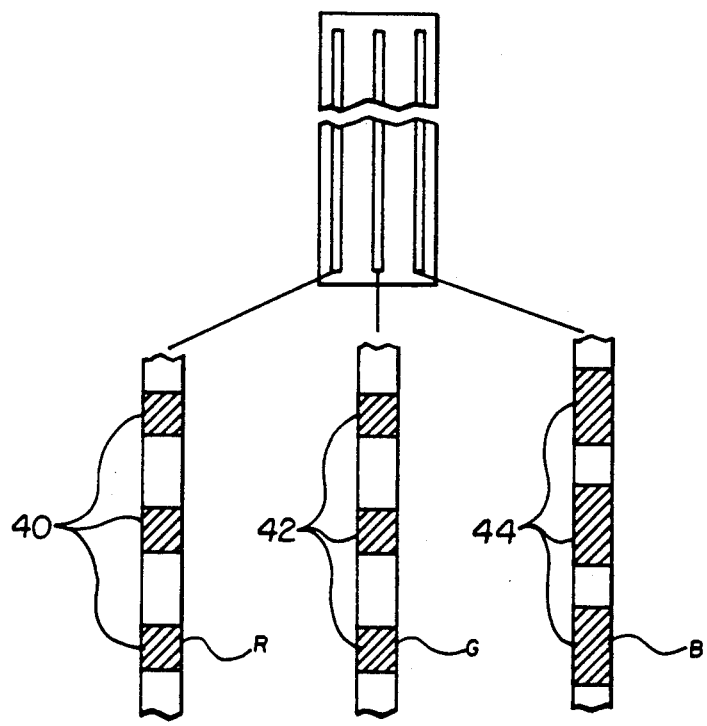
FIG. 3 is a schematic representation of a trilinear CCD sensor array structured in accordance with a feature of the invention.
Figure 4:
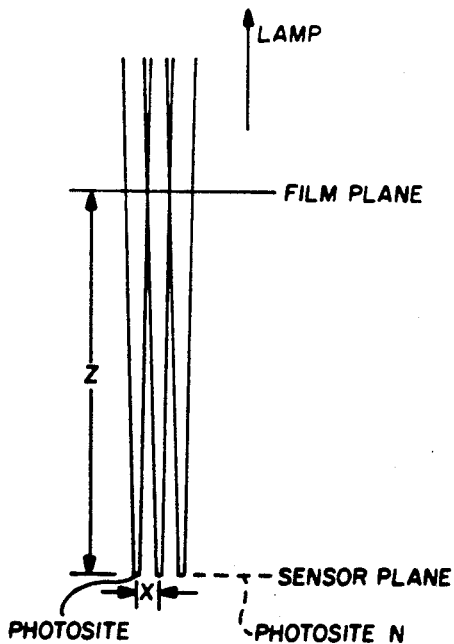
FIGS. 4 and 5 are graphic diagrams useful in explaining the operation of the invention.
Figure 5:
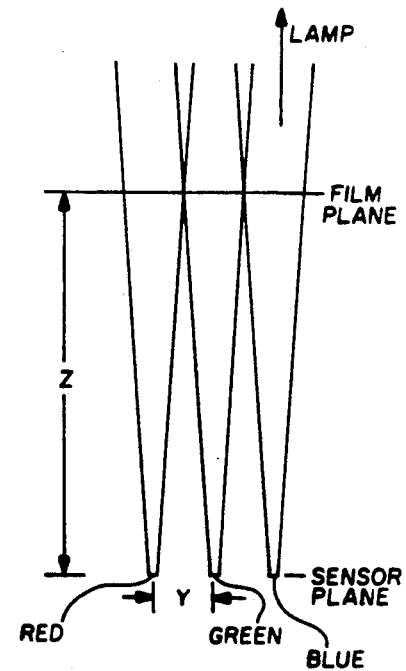

With conventional linear sensor arrays of the type shown in the aforementioned patents, the photosites of each array are butted against each other with the result that pitch between successive photosites is equal to one. In accordance with a particular feature of the present invention, and with reference to FIG. 3, the photosites 40, 42 and 44 of the red, green and blue linear sensor arrays R, G and B are separated by a predetermined pitch greater than one. In a preferred embodiment of the invention, pitch equal to three is used, i.e. three times the photosite dimension in the elongated dimension of the array. Thus assuming a photosite dimension of 0.014 mm by 0.014 mm, the pitch would be 0.042 mm., i.e the center-to-center spacing between successive photosites would be 0.042 mm. This spacing is significant because it allows for the surface of the CCD imaging sensor to be spaced some distance Z from the plane of the film. Thus, without any optics between the film and the sensor, each individual photosite will see a given portion of the film, i.e. an image pixel without any crosstalk to adjacent photosites and without leaving significant areas of the film image unscanned, i.e. the spaces between image pixels. This is due to the ability of the photosite to accept light from a reasonably defined set of angles. This is illustrated in FIGS. 4 and 5 which show the spacing between the sensor and film planes and the manner in which each photosite "sees" the corresponding image pixels in the film plane. In these figures, X represents the center-to-center spacing between successive photosites in the linear dimension of the sensor arrays, Y represents the spacing between each linear sensor in the main scan direction and Z represents the spacing between the sensor and film planes. As illustrated, the line-to-line spacing between successive linear arrays in the main scan direction is greater than the spacing X between photosites in the cross scan direction. This is to eliminate line-to-line crosstalk between sensors caused by a greater angle of view for the photosites in the main scan direction as compared to the cross scan direction. A preferred embodiment of the invention employs a basic photosite dimension of 0.014 mm×0.014 mm and a photosite pitch of 0.042 mm in the linear direction of the arrays, spacing between arrays in the main scan direction of 0.112 mm and a spacing in the Z direction of 0.065 inches (1.651 mm).

Referring again to FIG. 3, it will be seen that the photosites 44 of the blue responsive linear array B are larger than the corresponding photosites on the red and green responsive arrays R and G. This is to account for the fact that blue response is lower than the red and green response of the sensors. In the illustrated embodiment, the blue photosites are approximately twice the size of the red and green photosites. However, the pitch for the blue photosites is the same as for the red and green photosites. Thus, it will be understood the illustration in FIG. 4, showing substantially no pixel cross between photosites for the given photosite size and pitch relative to the Z dimension, applies, in the preferred embodiment, only to the red and green responsive arrays. Because the size of the blue photosites is significantly greater, they will "see" overlapping portions of adjacent photosites resulting in pixel crosstalk in the blue spectrum. This is not considered objectionable, however, since the picture information content in the red and green spectrums is substantially greater than in the blue spectrum and consequently the resultant crosstalk in the blue spectrum is not detrimental to the scanning process.

It will be appreciated that what has been described is a new, compact color film scanning apparatus that avoids the need for utilization of optical systems and that employs a novel trilinear type of image sensor having relatively fewer photosites needed to scan a given image area. The result is scanning apparatus that is reduced in size and complexity. With fewer photosite to process, the related cost and complexity of electronic image signal processing circuits is correspondingly reduced.

The invention has been described in detail with particular reference to a presently preferred embodiment, but it will be understood that variations and modifications can be effected within the spirit and scope of the invention.

What is claimed is:

1. Color film scanning apparatus comprising:
   a scan gate having (a) a film track to guide color film in a main scan direction of an image to be scanned as the film is advanced through the scan gate, (b) a film plane defining surface in the film track and (c) an elongated scan aperture in the film plane defining surface, the elongated dimension of the scan aperture being oriented in a subscan direction of the image orthogonal to the main scan direction;
   a light source positioned on the same side of the film in the scan gate as the scan aperture and being spaced sufficiently far from the scan aperture to effectively serve as a point source of light to the scan gate;

solid state image scanning means comprised of a plurality of parallel linear array sensors aligned with the scan aperture and exposed directly to a film image in the film plane without interposition of optical means or beam splitting means, each of the linear sensors having a plurality of image pixel sensing photosites, the linear sensors lying in a plane spaced from the film plane by a predetermined amount and the photosites in each linear sensor being spaced apart in the elongated dimension of each array by a predetermined pitch between successive photosites, in at least one of the arrays the size of the photosites and the pitch therebetween being such, relative to the spacing between the plane of the sensors and the film plane, as to allow successive photosites of at least one array to be exposed to substantially all the light from its respective image pixel on the image without substantial overlap with light from adjacent image pixels in the subscan direction.

2. Color film scanning apparatus of claim 1 in which the pitch between photosites in each of the plurality of linear sensor is substantially the same.

3. Color film scanning apparatus of claim 1 in which the image scanning means is comprised of three linear sensors differentially responsive respectively to red, green and blue colors in the film image.

4. Color film scanning apparatus of claim 3 in which the color responsive area of photosites in one of the sensors is different from the color responsive areas of photosites in the other sensors.

5. Color film scanning apparatus of claim 3 in which the color responsive area of photosites in the sensor responsive to blue color is larger than the color responsive areas in the sensors responsive to red and green.

* * * * *